July 31, 1962    J. W. HARRISON    3,046,711
MULTIPLE CAN CARRIER AND SANITARY SEAL
Filed Dec. 8, 1960

# United States Patent Office 3,046,711
Patented July 31, 1962

3,046,711
MULTIPLE CAN CARRIER AND
SANITARY SEAL
John W. Harrison, Winchester, Mass., assignor to W. R. Grace & Co., Cambridge, Mass., a corporation of Connecticut
Filed Dec. 8, 1960, Ser. No. 74,629
1 Claim. (Cl. 53—30)

This invention relates to multiple container carriers, known as multi-packs and is directed particularly to a carrier which will form a hooded seal extending over all areas of the container which may come in contact with the contents when the can is opened.

Among the objects of the invention are: to reduce the amount of material commonly required for the conventional multi-pak; to produce a multi-pak element which may be shipped in flat bundles thereby conserving shipping and storage space; to produce a container carrier which may be assembled on a group of containers in one exceedingly short operation; and to produce a carrier in which the tops and a portion of the bodies of the container are completely sealed in a water-proof impervious membrane, so that any pouring opening remains clean, sanitary and contamination of the container contents cannot occur as the liquid is poured out or consumed directly from the container.

Figure 1:
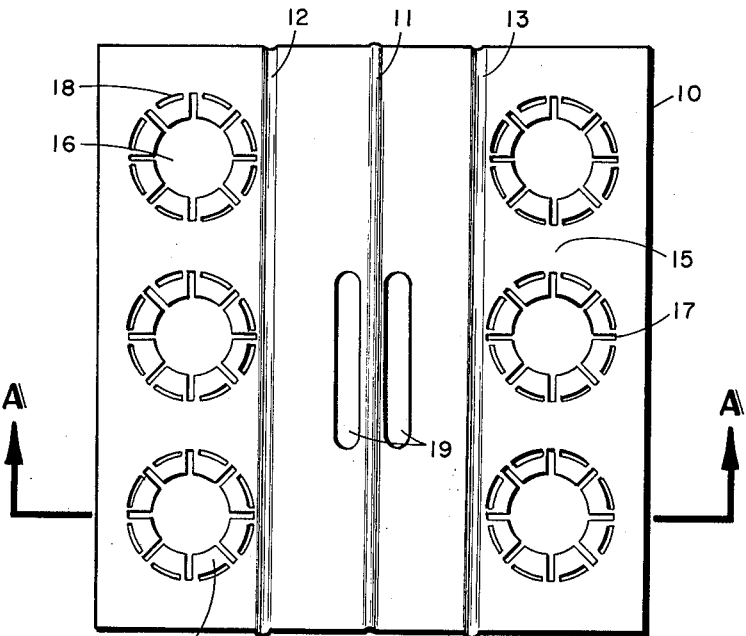
Figure 2:
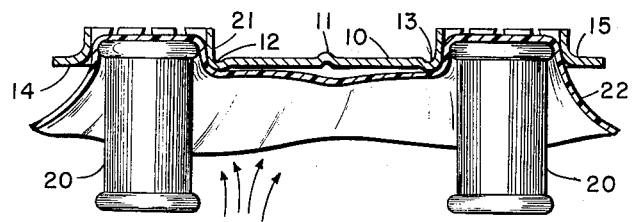
Figure 3:
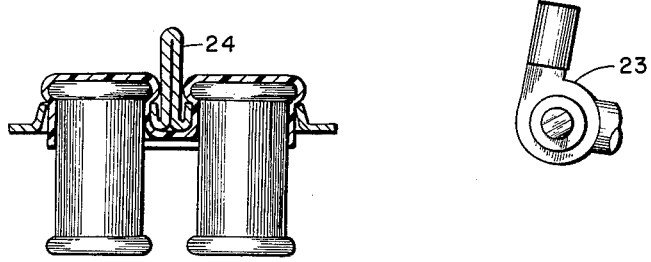

The invention will become obvious from the drawings in which FIGURE 1 is a plan view of the die-cut and scored carton board retainer. FIGURE 2 is an end view elevation, partially in section, of line A—A of FIGURE 1, and FIGURE 3 is an elevation, partially in section, of the end view of the completed carrier.

Referring to FIGURE 1, the retainer 10 is formed of carton board creased transversely at 11, 12 and 13. Crease 11 is formed in the lower surface 14, of the retainer 10, while creases 12 and 13 are formed in the upper surface 15. The three creases permit the retainer 10 to hinge about the respective crease lines.

A number of circular apertures 16 (usually 6) are cut in spaced rows through retainer 10. Each aperture is surrounded by a multiplicity of radial cuts 17 extending from the margin of the aperture outward to a concentric root-circle 18, the diameter of which equals the can end diameter. The sectors between the radial cuts 17 produce fingers 21, which are thrust upwardly when the retainer 10 is seated over the can ends.

Two transverse slots 19 parallel to and equally distant from the score line 11 are also cut in the retainer 10. The slots form a hand-hold when the carrier is completed.

The other component of the carrier is a simple sheet of a heat-shrinkable plastic film 22. Various types of heat-shrinkable, plastic films are suitable. Among such may be mentioned stretched films of rubber hydrochloride, stretched films of vinylidene chloride and films of analogous materials which have the necessary mechanical characteristics. But, because of its low cost and of its high tensile strength and very high shrink energy, I prefer to use irradiated polyethylene which, subsequent to irradiation, has been stretched in both directions at least 350%. Irradiated, biaxially oriented polyethylene has high shrink energy, i.e., from 100 to 500 p.s.i. at 96° C. Shrink energy is the force of contraction at a given temperature when the material is restrained and, more specifically, it is the measurable tension in a fully mono-directionally restrained strip of film when the film is heated to the specified temperature.

I have used, successfully, as the base material of the film, Alathon 14, having an average molecular weight of 20,000, a density of 0.914 and a melt index of 1.8— which has been irradiated to an extent of about 12 megarads and then has ben stretched biaxially 350% in both lateral and longitudinal directions—the finished thickness of the film was 1½ mils. This material possesses the shrink energy of about 150 p.s.i. in both directions at 96° C. The irradiation may be accomplished in a conventional manner, e.g., by the use of electron beam generators such as the 2,000,000 volt General Electric Resonant Transformer Unit, or a Van de Graaff Electron Accelerator operating at approximately 2,000,000 volts with a power output of 500 watts. Other radiation sources, such as Cobalt 60, may be employed provided equivalent total dosage is given. Biaxial orientation may be accomplished by forcing air into a heated tube of polyethylene to form a bubble which is then trapped between two sets of pinch rolls. As the air enters, the tube of polyethylene undergoes both radial and longitudinal stretching to accommodate the air bubble. Trapped between the pinch rolls, the bubble "rides" through the whole length of the extrusion, stretching the polyethylene both laterally and longitudinally and simultaneously thinning the extrusion to film thickness.

To assemble the carrier, a number of cans 20 (usually 6), located to coincide with the can orifices which have been cut in the retainer 10, are arranged in two spaced rows. The heat-shrinkable film 22, both transverse and longitudinal dimensions of which exceed those of the retainer 10 by two or three inches, is centered over the prearranged cans 20. Then the retainer 10 is pushed down over all of the cans until the fingers 21, which are now bent upwardly, seat beneath the end double seam of the can 20. In doing so, they drag the plastic film 22 down over the can tops and over a portion of the side wall of each can forming a pleated hood.

A blast of hot air from a heat gun 23 is then directed upwardly against the exposed surface of the film 22. Since the film 22 then shrinks violently, the two rows of cans are drawn together and the retainer 10, in response to this movement, hinges about the central crease 11 and creases 12 and 13 to form the erect carrying handle 24. Stapling or glueing the handle is unnecessary. Thereafter, the heat gun 23 is directed at the tops of the cans 20 and, particularly, around their double seam area. There, heating causes the film 22, which covers the can ends, to shrink. Shrinking also smooths out the pleats and draws the film 22 tightly about the can body so that the film 22 hugs in under the double seam, in effect, forming a drum-tight hood. In this manner each can end is completely covered with a tight, clinging, water-proof membrane.

Shrinkage, or rather the inward pull from all directions, makes the carrier very rigid. It will, consequently, hold the cans securely in an effective "carry home" package, and will withstand considerable abuse.

The manufacture of this carrier requires only a simple die cut and rule crease which may be accomplished in a single press stroke. The retainers 10, are shipped flat. The film may be shipped either in rolls or in cut sheets so that for a very large number of carriers a minimum of shipping and warehouse space is required.

It is obvious that the utility of the carrier is not confined to metal cans but that containers made of any material—which have a shoulder or flange over which the film can be shrunk—can be successfully used. The lip formed by the crown seal or cap on a glass jar or bottle or the bead beneath the cap would provide the shoulder necessary to practice the invention.

In the specification and claim the word "can" is used with this significance.

I claim:
The method of forming a can carrier which comprises spaced rows, forming hinge creases in the intermediate forming a retainer having a series of apertures cut in area of the retainer between the rows, surrounding each aperture with a series of radial slits extending from the margins of each aperture to a root-circle approximately that of the can end, spreading a film of heat-shrinkable plastic material over the tops of pre-arranged cans, pushing the retainer down over the assembly of cans until the sectors between the radial slits produce upthrust fingers which lock beneath the can end seams and draw the plastic down over each can as a pleated hood, heating the area between the cans to cause the rows of cans to draw together and upthrust the intermediate area of the retainer into an erect handle, then heat-shrinking the film covering the can ends and the adjacent portions of the can bodies to complete the carrier.

References Cited in the file of this patent

UNITED STATES PATENTS

| | | |
|---|---|---|
| 1,737,326 | Toensmeier | Mar. 6, 1956 |
| 2,874,835 | Poupitch | Feb. 24, 1959 |
| 2,878,628 | Curry | Mar. 24, 1959 |
| 2,896,779 | Armel | July 28, 1959 |
| 2,934,867 | Vogt | May 3, 1960 |